United States Patent
Prouzet et al.

(10) Patent No.: US 9,969,482 B2
(45) Date of Patent: May 15, 2018

(54) DEVICE FOR ASSISTING THE OPERATION OF AN AIRCRAFT DOOR

(71) Applicant: RATIER FIGEAC, Figeac (FR)

(72) Inventors: Bertrand Prouzet, Figeac (FR); Helene Bergonnier, Figeac (FR); Eric Delbos, Lacapelle-Marival (FR)

(73) Assignee: RATIER FIGEAC, Figeac (FR)

( * ) Notice: Subject to any disclaimer, the term of this patent is extended or adjusted under 35 U.S.C. 154(b) by 50 days.

(21) Appl. No.: 14/436,594

(22) PCT Filed: Oct. 17, 2013

(86) PCT No.: PCT/FR2013/052485
§ 371 (c)(1),
(2) Date: Apr. 17, 2015

(87) PCT Pub. No.: WO2014/060705
PCT Pub. Date: Apr. 24, 2014

(65) Prior Publication Data
US 2016/0169251 A1    Jun. 16, 2016

(30) Foreign Application Priority Data
Oct. 18, 2012  (FR) .................................... 12 02790

(51) Int. Cl.
*B64C 1/14*  (2006.01)
*F16F 9/06*  (2006.01)
*F15B 1/04*  (2006.01)

(52) U.S. Cl.
CPC .............. *B64C 1/1407* (2013.01); *F15B 1/04* (2013.01); *F16F 9/065* (2013.01); *F15B 2201/3153* (2013.01); *F15B 2201/3158* (2013.01)

(58) Field of Classification Search
CPC ....... B64C 1/1407; B64C 1/24; B64C 1/1415; B64C 1/1423; F15B 1/021; F15B 1/04;
(Continued)

(56) References Cited

U.S. PATENT DOCUMENTS 3,101,131 A * 8/1963 Bourcier De Carbon .................. F16F 9/067
188/320
3,287,008 A * 11/1966 Fernandez .............. F16F 9/088
188/269

(Continued)

FOREIGN PATENT DOCUMENTS

CN   101423009 A   5/2009
DE   29702927 U1   5/1997
(Continued)

OTHER PUBLICATIONS

English translation of Chinese Office Action dated Nov. 27, 2017, in corresponding Chinese Application No. 201380064590.8.

*Primary Examiner* — Justin B Rephann
(74) *Attorney, Agent, or Firm* — Volpe and Koenig, P.C.

(57) ABSTRACT

A device according to the present invention comprises:
a tubular body (2) and a first attachment means (6),
a piston (30) provided with a rod (12) connected to a second attachment means (10), the piston (30) sliding inside the tubular body (2) and defining inside said body a working chamber filled with hydraulic fluid,
an accumulator comprising a rigid shell (20) inside of which a separation means (40) is located, defining a compensation chamber (42) that is filled with hydraulic fluid and is in communication with the working chamber, and a chamber (47) filled with pressurized gas, the rigid shell (20) being a metal shell produced by means
(Continued)

of welded assembly and the accumulator being made such as to obtain an entirely welded enclosure (47) containing the gas.

12 Claims, 6 Drawing Sheets

(58) Field of Classification Search
CPC ...... F15B 2201/3153; F15B 2201/3158; F16H 19/06; F16H 2019/0695; F16F 9/065
See application file for complete search history.

(56) References Cited

U.S. PATENT DOCUMENTS

| | | | | |
|---|---|---|---|---|
| 3,512,243 A | * | 5/1970 | Kensei | F16F 9/43 141/37 |
| 4,054,277 A | * | 10/1977 | Sirven | B60G 3/01 188/276 |
| 4,131,139 A | * | 12/1978 | Tanabe | F16F 9/432 139/384 B |
| 4,601,446 A | * | 7/1986 | Opsahl | B64C 1/1415 16/289 |
| 4,614,255 A | * | 9/1986 | Morita | F16F 9/096 188/298 |
| 4,746,106 A | * | 5/1988 | Fukumura | F16F 9/468 267/218 |
| 4,813,519 A | * | 3/1989 | Matsubara | F16F 9/096 188/266.4 |
| 4,858,898 A | * | 8/1989 | Niikura | B60G 15/12 267/218 |
| 4,921,227 A | * | 5/1990 | Fukumura | F16F 9/096 188/314 |
| 5,042,781 A | * | 8/1991 | Ezure | F16F 9/088 267/64.23 |
| 5,158,267 A | * | 10/1992 | Pascal | B64C 25/60 188/282.1 |
| 5,295,563 A | * | 3/1994 | Bennett | B60G 17/0152 188/266.2 |
| 5,704,569 A | * | 1/1998 | Daniels | B64C 1/1415 244/129.4 |
| 5,727,440 A | * | 3/1998 | Katz | F16F 9/06 91/4 R |
| 5,803,404 A | * | 9/1998 | Petrou | B64C 1/24 188/267 |
| 6,378,848 B1 | * | 4/2002 | Uchida | B60M 1/26 267/64.25 |
| 7,114,431 B1 | * | 10/2006 | Holder | B64C 1/1407 91/436 |
| 7,219,881 B2 | * | 5/2007 | Denk | B60G 17/0432 267/64.15 |
| 8,267,382 B2 | | 9/2012 | Yazaki et al. | |
| 2006/0010769 A1 | * | 1/2006 | Pelz | B64C 1/1407 49/141 |
| 2006/0180418 A1 | | 8/2006 | Kojima et al. | |
| 2008/0018035 A1 | * | 1/2008 | Porter | B60G 17/08 267/218 |
| 2009/0107780 A1 | * | 4/2009 | Yazaki | F16F 9/092 188/269 |
| 2010/0186843 A1 | | 7/2010 | Wellner et al. | |
| 2014/0000448 A1 | * | 1/2014 | Franklin, III | F16F 9/56 91/4 R |
| 2014/0084600 A1 | * | 3/2014 | Lamat | B64C 1/1407 292/92 |
| 2014/0138488 A1 | * | 5/2014 | Berthoud | E05D 13/123 244/129.5 |

FOREIGN PATENT DOCUMENTS

| | | |
|---|---|---|
| DE | 102007036487 A1 | 2/2009 |
| EP | 0876954 B1 | 9/2003 |
| GB | 489618 A | 7/1938 |
| WO | 2012112974 A2 | 8/2012 |

* cited by examiner

DEVICE FOR ASSISTING THE OPERATION OF AN AIRCRAFT DOOR

FIELD OF THE INVENTION

The present invention relates to a device for assisting the operation of an aircraft door, possibly incorporating a damper. Here, the term "operation of a door" is understood to mean either opening the door or closing the door, and possibly both opening and closing the door.

BACKGROUND

There are different types of doors providing access to the aircraft, depending on the type of aircraft. The door is adapted to the size of the aircraft, for example. On an aircraft for transporting passengers, the doors used by passengers to board and disembark will not be the same as those used to load and unload luggage. It is also possible for the emergency exit doors to have a structure different from that normally used for boarding.

The invention relates more particularly to aircraft doors pivoting about a substantially horizontal axis (when the corresponding aircraft is on the ground, of course), meaning doors where the weight of the door opposes the operation of the door as it opens and closes. Even more particularly, the invention relates to doors intended for the passage of passengers. There are aircraft passenger doors which open downward and which may integrate a staircase providing access to the aircraft. This type of door is primarily on passenger aircraft for business travel and/or intended for transporting several dozen passengers. Passenger doors that open upward are found, for example, above the wings of an aircraft and are usually provided as emergency exits only.

It is known in the field of aeronautics or in other fields to use one or more gas springs to facilitate opening—or also closing—a door, a hood, a cover, or the like, and/or to hold it in the open position.

In the prior art, it is known to associate a damper having a plurality of gas or coil compression springs in order to damp the opening of the corresponding door, where the springs compensate for the weight of the door.

In a field unrelated to aeronautics, document US-2006/0180418 shows a cylinder in which two pistons slide. A first piston comprises a piston head and a piston rod and divides the cylinder into two chambers filled with hydraulic fluid. A second piston is a "free" piston separating one of the chambers filled with hydraulic fluid from a chamber filled with gas. The fluidtightness between the chamber filled with gas and the neighboring chamber filled with hydraulic fluid is achieved by a gasket placed between the second piston and the inner wall of the cylinder. As the second piston is intended to move within the cylinder, leakage of gas from the gas-filled chamber cannot be prevented, inevitably modifying the characteristics of the system described and presented in that document.

Document DE 297 02 927 U1 relates to a gas spring damped by a fluid intended more particularly for a bicycle suspension. Here, a gas-filled chamber is separated from the hydraulic fluid used for damping, by a flexible membrane. A valve (denoted by the reference 16) is provided to allow adjusting the pressure within the gas-filled chamber, for example using a bicycle pump.

Figure 3:
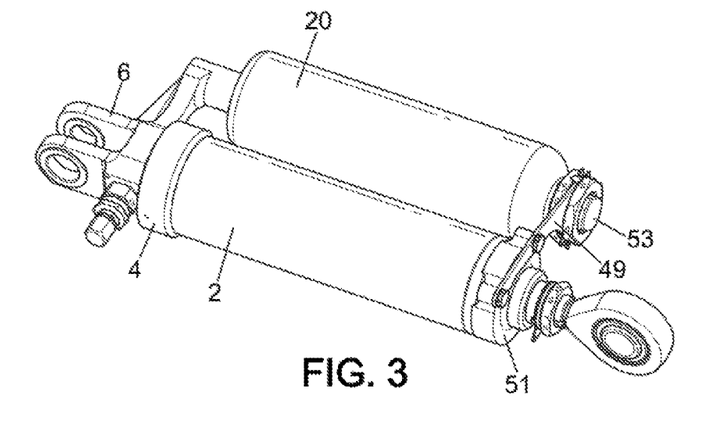
FIG. 3 is a view corresponding to the view of FIG. 1 and illustrating a variant embodiment of a device according to the invention.

In aeronautics, document EP 0 876 954 B1 illustrates, particularly in its FIGS. 3 and 9 (see § [0019]), the use of a damper mounted between two compression springs to assist with opening an aircraft door.

SUMMARY

The present invention aims to optimize this solution in which means for assisting the operation of an aircraft door are mounted in parallel with damping means for preventing sudden maneuvers. The optimization will focus for example on the weight of the system (very important in aeronautics) and on ease of assembly.

Another problem addressed by the present invention relates to the reliability of the device for assisting the operation of an aircraft door. When several separate mechanical elements are mounted in parallel, the mean time to failure of the entire mechanism is less than the mean time to failure of each of the components taken separately. The solution proposed by the present invention will preferably allow obtaining a high mean time to failure. Indeed, as the device can be implemented on emergency exits, one should be able to guarantee that this device will work when needed.

Another object of the invention is to provide a device for assisting operation, preferably with an associated damping function, that is easy to implement. The device of the invention will therefore advantageously be easy to assemble and of reduced weight. One will note that by mounting several elements in parallel, multiple fasteners must therefore be provided. Advantageously, the number of fasteners required for mounting a device according to the invention will be limited, preferably to two attachment points, a first attachment point on a fixed frame portion and another point of attachment on the corresponding door.

To this end, the invention proposes a device for assisting the operation of an aircraft door, comprising:
a tubular body associated with first fastening means,
a piston provided with a rod connected to second fastening means, the piston sliding inside the tubular body and defining inside said body a working chamber filled with hydraulic fluid,
an accumulator comprising a rigid shell inside of which is located a separation means defining a compensation chamber filled with hydraulic fluid and in communication with the working chamber, and a chamber filled with pressurized gas.

According to the invention, the rigid shell is a metal shell formed by welded assembly, and the separation means in the accumulator comprises a metal bellows welded on the one hand to the rigid shell of the accumulator which has a circular cylindrical shape, around an opening of said shell which allows communicating with the working chamber, and on the other hand to a base, so as to obtain an entirely welded enclosure containing the gas.

The device according to the invention has the advantage of being compact. The spring function is achieved by means of the pressurized gas which, by means of the hydraulic fluid, generally acts on the piston in the direction causing the plunger rod to slide out from the tubular body. Then one only needs to adjust the pressure within the fluid to change the force acting on the piston. In addition, for an aeronautical application, high system reliability is provided by the entirely welded construction of the accumulator, as the chamber containing the pressurized gas is closed by welding, without any gaskets. This structure provides complete separation and the gas can remain pressurized for years with no leakage.

In a device for assisting the operation of an aircraft door according to the invention, the chamber filled with pressurized gas is filled for example with an inert gas such as nitrogen.

To enable obtaining high pressures in a device for assisting operation according to the invention, the working chamber advantageously comprises a filling valve. It is thus possible to first fill the chamber provided for this purpose with pressurized gas and to trap it within the accumulator by welding the opening where the gas was introduced, then to fill the system with pressurized hydraulic fluid to ensure the presence of fluid in the working chamber, in the compensation chamber, and between these two chambers. After the filling valve is closed, the system is completely pressurized. One will note that it is easier to create a valve that is truly fluidtight to pressurized hydraulic fluid than to gas.

To control the damping function provided by the circulation of hydraulic fluid as the piston moves within the tubular body, it can be arranged that a pipe provides communication between the working chamber and the compensation chamber and that this pipe is equipped with a damping system, for example a damping valve or a choke valve.

Damping can also be achieved when the tubular body has a second chamber filled with hydraulic fluid and separated from the working chamber by the piston. A passage can then be provided in the piston to connect the second chamber and the working chamber. For better control of the damping achieved within such a passage, said passage may comprise a damping system (choke valve or similar).

The base welded to the metal bellows may be a piston having a shape adapted to slide within the rigid shell of the accumulator. This piston preferably slides freely, the pressurized gas preferably moving freely from one side of the piston to the other.

The invention also relates to an aircraft door comprising a device for assisting the operation of a door as described above.

In such an aircraft door, it is advantageous to have the tubular body of the device for assisting the operation of an aircraft door hingedly mounted on the door and to have the piston rod hingedly mounted on a fixed frame associated with the door. Conversely, the tubular body of the device for assisting the operation of an aircraft door may be hingedly mounted on a fixed frame associated with the door and the piston rod is hingedly mounted on the door.

Another embodiment adapted for an aircraft door that tilts open provides, for example, the following characteristics:
  the tubular body of the device for assisting the operation of an aircraft door is fixed to the door (or alternatively to the structure of the aircraft),
  the piston rod supports a first pulley at its free end opposite the piston,
  the tubular body of the device for assisting the operation of an aircraft door supports a second pulley, and
  a cable, having a first end attached to the tubular body of the device for assisting the operation of a door, passes over the first pulley then over the second pulley, the cable end opposite the first end winding or unwinding on a third pulley pivotally mounted on the door (or alternatively on the structure of the aircraft).

In this embodiment (and in its alternative variant), it may further be provided that the third pulley is mounted coaxially to a fourth pulley, the third pulley and the fourth pulley being rotated by a motor, and the fourth pulley receives another cable having a first end fixed to a frame associated with the door (to the door in the proposed alternative variant) and a second end winds or unwinds on the fourth pulley in a manner that controls the opening or closing of the door.

BRIEF DESCRIPTION OF THE DRAWINGS

Features and advantages of the invention will become more apparent from the following description, with reference to the accompanying drawings in which.

DETAILED DESCRIPTION OF THE PREFERRED EMBODIMENTS

Figure 1:
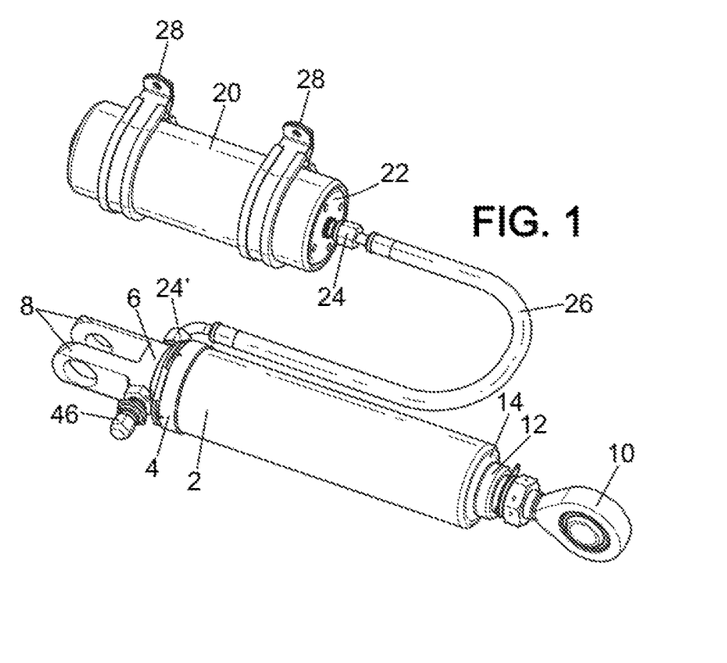
FIG. 1 illustrates a device according to the invention in a perspective view.

FIG. 1 illustrates a first embodiment of a device for assisting the opening of an aircraft door with damping, according to the invention. Two modules connected to one another can be identified in this figure.

A first module, represented in the lower position in FIG. 1, has a tubular body 2 of a generally circular cylindrical shape. Said tubular body 2 is closed at one end by a cover 4 that supports fastening means. In the embodiment represented, the fastening means consist of a bracket 6. FIG. 1 shows only an edge of the cover 4. The cover also comprises a disc which closes off the tubular body 2 and which lies perpendicularly to the longitudinal axis of the tubular body 2.

The bracket 6 comprises a base attached to the cover 4 or an integral part of the cover. Two arms 8 extend from the base of the bracket 6. These arms 8 are parallel and each has a hole, the two holes being aligned to allow receiving a shaft (not shown). The bracket 6 can receive between its arms 8 the ball joint of a rod end bearing (not shown), for example similar to the rod end bearing 10 shown in FIG. 1 on the end of the tubular body 2 opposite the cover 4.

The rod end bearing 10 represented in the drawing is attached to the end of a piston rod 12 which projects out of the tubular body 2 through a base 14 which preferably lies perpendicularly to the longitudinal axis of the tubular body 2. The base 14 and the piston rod 12 close off the end of the tubular body 2 opposite the cover 4.

The second module, represented in the upper position in FIG. 1, is also called an accumulator and comprises a rigid shell 20. This shell 20 has a generally circular cylindrical shape that is closed at both ends. A baseplate 22 corresponding to one of these ends is provided with a fitting 24 to which is attached a flexible pipe 26 connecting the two modules shown in FIGS. 1 and 2.

The second module is equipped with fastening lugs 28 to be used to retain the accumulator on a support, for example by screwing or welding.

Figure 2:
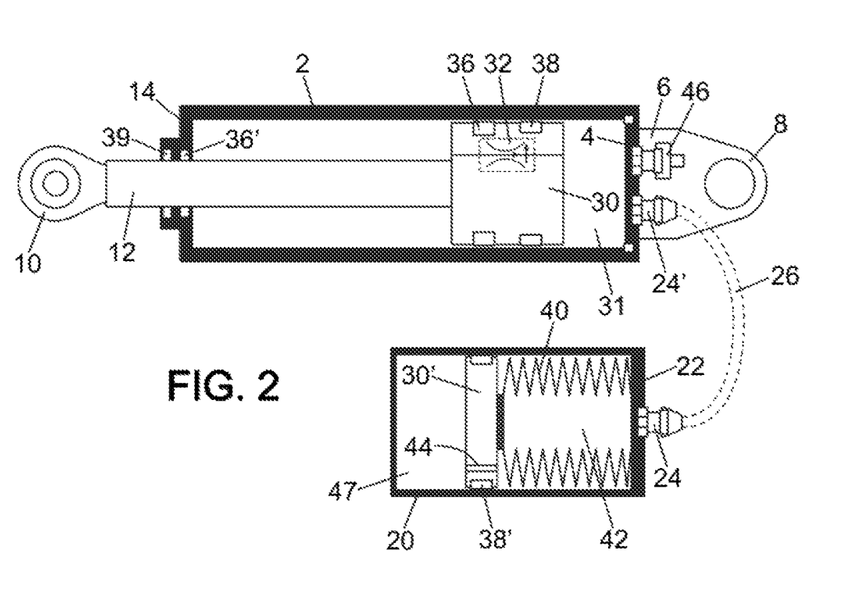
FIG. 2 is a schematic cross-section illustrating the principle of a device according to the invention.

FIG. 2 is a schematic longitudinal sectional view of the spring and damper device illustrated in FIG. 1. Unlike FIG. 1, the first module is arranged at the top of FIG. 2 and its right/left orientation is inverted relative to FIG. 1. The second module is shown at the bottom of FIG. 2, but retains the same right/left orientation as in FIG. 1.

FIG. 2 shows the interior of the tubular body 2 and accumulator.

Inside the tubular body 2 there is a piston 30 supported by the piston rod 12 or an integral part of said rod, at the end of the rod opposite the end receiving the rod end bearing 10. The piston 30 defines a working chamber 31 within the tubular body 2 between the piston and the base 4.

In the embodiment illustrated in FIG. 2, all the free space inside the tubular body 2 is filled with hydraulic fluid (commonly and more simply referred to as "oil"), both the working chamber 31 and the chamber defined below the piston 30 between the latter and the base 14 traversed by the piston rod 12. The piston 30 can slide inside the tubular body 2 and the hydraulic fluid can pass from one side of the piston 30 to the other. To allow such passage, a damping system is provided within the piston 30, such as the system represented in FIG. 2 by a choke valve 32. The piston 30 has two faces substantially transverse to the longitudinal axis of the tubular body 2: the first of these faces is located on the side of the piston rod 12 and is facing the base 14, while the other transverse face is facing the cover 4. The choke valve 32 connects the two transverse faces.

A seal is formed between the piston 30 and the inner wall of the tubular body 2. To achieve this seal, a dynamic seal 36 is provided. A ring 38 is provided to guide the piston 30. In order to travel from one face of the piston 30 to the other, the hydraulic fluid must pass through the damping system (the choke valve 32 in FIG. 2). In this manner, a damping function is achieved within the tubular body 2.

Note also in FIG. 2 the presence of sealing means between the piston rod 12 and the base 14. A dynamic seal 36 and a wiper ring 39 may be provided for this purpose.

When the piston 30 moves within the tubular body 2, the volume of hydraulic fluid within the tubular body 2 varies (due to the variation in the length of the piston rod 12 located inside the tubular body 2). A fitting 24' is illustrated on the cover 4 in FIG. 2, which allows fluid to enter and exit the tubular body 2. The fitting 24' is shown on the cover 4 in FIG. 2 in order to be apparent in this sectional view. This fitting 24' appears on the base of the bracket 6 in FIG. 1. Those skilled in the art will understand that the position of this fitting 24' is adapted to external constraints. It may therefore be on the cover 4, on the bracket 6, or even directly on the tubular body 2. This fitting 24' is attached to the flexible pipe 26 which connects the two modules shown in FIGS. 1 and 2.

As indicated above, the rigid shell 20 has a tubular circular cylindrical shape that is closed at both ends. Only one hydraulic fluid inlet/outlet is provided, by the fitting 24 which, in the embodiment represented, is located at one end of the rigid shell 20.

Inside the rigid shell 20 is a piston 30' which is mounted so as to slide along the inner wall of the shell 20. A ring 38' acts as guide between the piston 30' and the inner wall of the shell 20.

The shell 20 also contains a metal bellows 40. This bellows is welded to the piston 30' and to the end of the shell 20 supporting the fitting 24. A metal bellows has the advantage of being completely gas-tight. The metal bellows 40 is welded to the inside of a metal frame which itself is welded. This therefore provides an entirely fluidtight gas chamber. The shell 20 thus allows maintaining the pressure of the hydraulic fluid, even when significant.

Within the shell 20 there is therefore a first volume essentially defined by the inner wall of the metal bellows 40 and forming a compensating chamber 42 for the hydraulic fluid located within the tubular body 2 and a second volume forming a chamber 47 filled with pressurized gas. The flexible pipe 26 provides communication between the compensation chamber 42 and the working chamber 31.

The pressures within the system described above can be very significant. As is apparent from the foregoing description, this pressure will be determined by the force required at the piston rod 12. The advantage of the proposed system is that it allows working with pressures of several tens of bars. As a non-limiting numerical example, the pressure may range for example from 25 to 200 bar. Note that the gas-filled chamber 47 is entirely welded. It is therefore completely sealed.

To create the completely sealed chamber 47, and then adjust the pressure in the system, the accumulator is formed by the welded assembly of a tube and a base, an assembly formed by the piston 30' to which is welded one end of the metal bellows 40 and the baseplate 22 to which is welded the other end of the metal bellows 40 is placed in the tube, the baseplate 22 then also being welded to the shell tube. A filling valve may be provided for example, on the base of the shell 20 opposite the baseplate 22. This valve is used to fill the chamber 47 with nitrogen (or some other fluid) to the desired pressure, and then the filling valve is welded to ensure that the chamber 47 is completely sealed.

Next, the system is filled with hydraulic fluid to the desired pressure. This is done by a filling valve 46, shown on the base of the bracket 6 in FIG. 1 and on the cover 4 in FIG. 2. Those skilled in the art will understand that the location of the filling valve can be adapted, for example to take into account external constraints. It is also conceivable for this filling valve 46 to be placed on the shell 20 (and of course opening into the metal bellows 40). Gasket sealing is preferably used at the filling valve for the volume containing hydraulic fluid, because it is possible to use gaskets to achieve reliable fluidtightness with pressurized hydraulic fluid.

FIG. 3 illustrates an alternative embodiment where the operation is similar to the device illustrated in FIGS. 1 and 2. FIG. 3 uses the same references as FIGS. 1 and 2 to designate similar elements.

In the alternative embodiment shown in FIG. 3 there is again a first module and a second module, but these are rigidly connected to one another. The first module comprises a tubular body 2 closed at one end by a cover 4 supporting fastening means which are represented here as a bracket 6.

The second module again comprises a rigid shell 20 having for example an internal structure similar to the internal structure of the rigid shell 20 illustrated in FIGS. 1 and 2.

To create the connection between the two modules, it is proposed here to machine a part that groups the cover 4 and the bracket 6 and that also integrates a pipe providing a connection between the working chamber 31 within the tubular body 2 and the compensation chamber 42 of the accumulator. On the side opposite the cover 4, the first module is connected to the second module by a connecting arm 49. This arm can be attached by any means to the tubular body 2 and to the shell 20. As a purely illustrative example, the connecting arm 49 is screwed onto a ring 51 fixed to the tubular body 2. The connecting arm 49 may also have a hole for receiving a threaded rod 53 integral to the shell 20. The connecting arm 49 can then be retained on the threaded rod 53 by two nuts as shown in FIG. 3.

According to another variant, not illustrated, the two modules could lie one as the extension of the other and could possibly make use of the same tubular portion to create the tubular body 2 and the shell 20. However, to create a completely sealed chamber 47 filled with gas, the space inside the tubular portion is preferably separate, thus also establishing a separation between the working chamber 31 and the compensation chamber 42.

The devices described above allow pressurizing the hydraulic fluid to avoid cavitation issues at the damping system outlet (choke valve or other means). This allows maintaining a high level of performance in the damping function provided by the device, and in all positions, even when the device is subjected to sudden accelerations.

These devices also act to provide a "spring" function which is easily adjustable by adjusting the gas pressure and the volume of the corresponding chamber.

The architecture of the described devices also allows providing effective compensation which operates at (very) low temperatures as well as at (very) high temperatures.

In addition, one will note that there is no contact between the gas and the hydraulic fluid, which are therefore completely separated from each other. This eliminates any risk of unpriming, emulsion, and/or dilution, regardless of the mounting position of the system. This property is particularly important when the system is mounted on a movable element such as an aircraft door. In the mentioned case of an emergency door, it is very important that the system still be operational even after a crash, meaning after sudden intense acceleration (several times the gravitational acceleration G).

In addition, the complete separation of the gas and hydraulic fluid, which is achieved without the use of a dynamic seal, ensures high levels of reliability and security for the spring function which is not compromised.

Figure 4A:
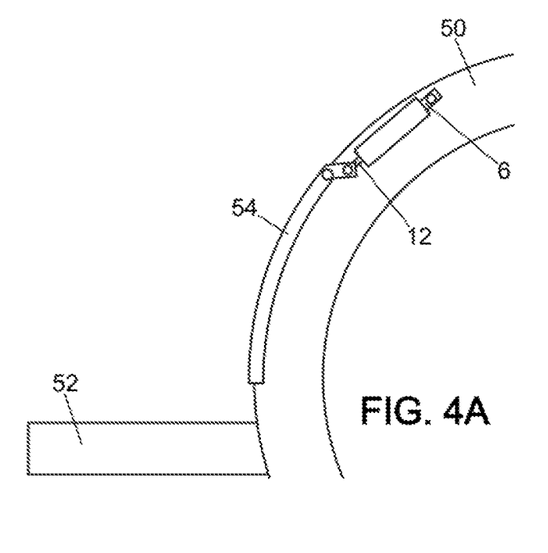
FIGS. 4A and 4B illustrate an application of a device according to the invention to the opening of an aircraft door, the door being respectively shown in the closed and open position.
Figure 4B:
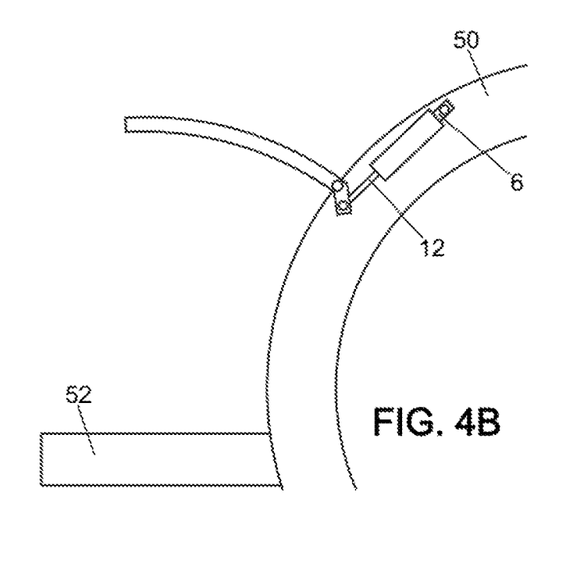

FIGS. 4A and 4B illustrate an application of a system for assisting the operation of a door described above. These figures show a highly schematic partial representation of a section of an aircraft fuselage 50. A wing 52 is also indicated in these figures. The device illustrated in FIGS. 1 and 2 is used for opening a door 54. In the application illustrated in FIGS. 4A and 4B, the bracket 6 of the system is used to attach it to the aircraft fuselage 50 while the piston rod 12 is connected, for example by means of the rod end bearing 10 or by some other fastening means, to the door 54.

Figure 5A:
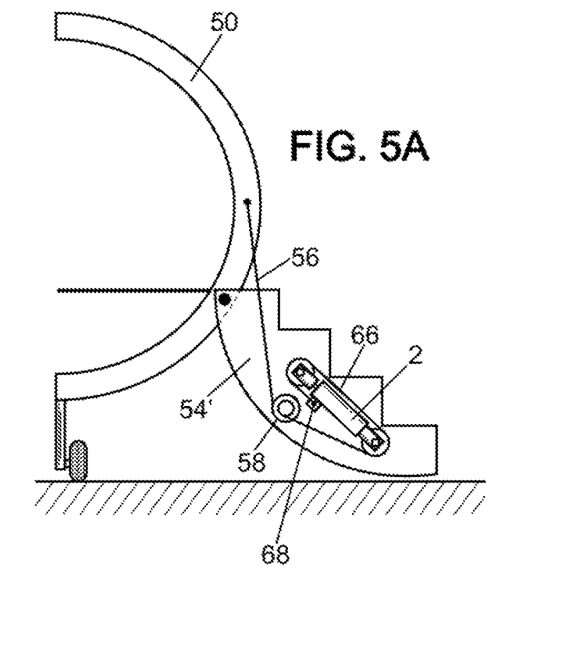
FIGS. 5A to 5C illustrate another application of a device according to the invention, for another type of door.
Figure 5B:
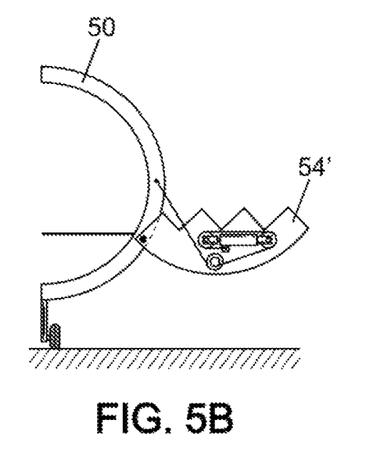
Figure 5C:
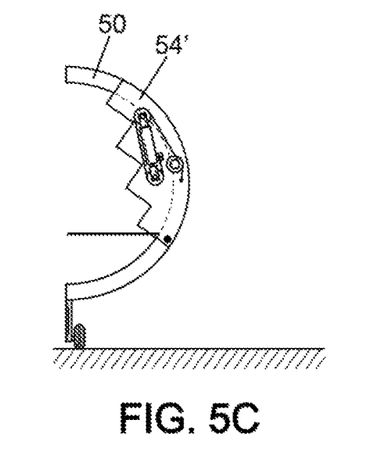

FIGS. 5A to 5C illustrate another application for another type of door 54'. While in FIGS. 4A and 4B the door 54 opens upwards, meaning the weight of the door 54 opposes its opening, the door 54' of FIGS. 5A to 5C opens downwards, with the weight of the door 54' pulling on the door as it opens.

To control the opening and closing of the door 54', a cable system is provided. A connecting cable 56 connects the door 54' to a fixed point of the fuselage 50, for example to a frame associated with the door 54'. On the door 54', one end of the connecting cable winds or unwinds around a motorized pulley 58. Said pulley is rotated by a motor (not shown). The motorized pulley 58 is arranged in a substantially vertical plane. The skilled person will readily understand that when the connecting cable 56 winds onto on the motorized pulley 58 the door 54' closes, while it opens when the connecting cable 58 unwinds from the motor pulley 58. The connecting cable 56 remains taut due to gravity.

As shown in FIGS. 5A, 5B, and 5C, a device for assisting the operation of an aircraft door as described above is associated with the motor, its pulley, and the connecting cable 56.

The tubular body 2 and the accumulator are attached to the door 54' such that the piston 30 and its piston rod 12 are oriented in a vertical plane. The piston rod 12 supports on its free end a first pulley 60 oriented in a vertical plane. A second pulley 62 is fixed to the tubular body 2 on the end opposite the first pulley 60, in the same vertical plane as the latter. A third pulley 64 is provided, still substantially in the same vertical plane as the first pulley 60 and the second pulley 62, the third pulley being mounted coaxially to the motorized pulley 58.

A support cable 66 has a first end attached to a fixed attachment point 68, for example located on the tubular body 2. This support cable 66 then passes over the first pulley 60 before reaching the second pulley 62. The other end of the support cable 66 is attached to the third pulley 64 and winds or unwinds around it.

When the motor drives the motorized pulley 58, it is assumed that it also drives the third pulley 64. The "effective" length of the support cable 66 varies in length according to the winding of the support cable 66 on the third pulley 64. This length determines the position of piston 30 in the tubular body 2 due to the action on the piston rod 12. As shown in FIGS. 5A to 5C, it is provided for example that the piston rod 12 is substantially at its maximum retraction within the tubular body 2 when the door 54' is open, and is substantially at the end of its outward stroke when the door 54' is closed (FIG. 5C). FIG. 5B illustrates an intermediate position. The radius of the third pulley 64 can be adapted for example to reduce the stiffness of the device, thus reducing the general variations in performance over the range of operating temperatures.

With such kinematics, the device for assisting the operation of the door 54' allows controlling the speed of the door 54' as it opens, due to its damping function. During a closing phase of the door 54', the spring effect of the device for assisting the operation of the door creates a torque that compensates for some or all of the weight of the door 54'.

Figure 5D:
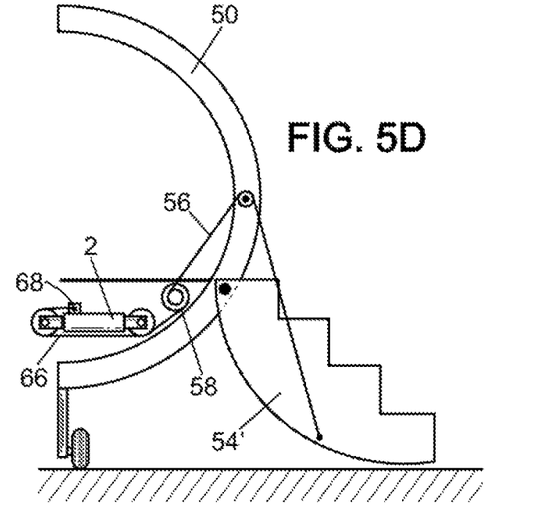
FIGS. 5D and 5E show a variant embodiment of the application illustrated in FIGS. 5A to 5C, and
  FIGS. 6 to 8 are views similar to FIG. 2 for embodiments of a device for assisting the operation of a door for an application such as that illustrated in FIGS. 5A-5E.
Figure 5E:
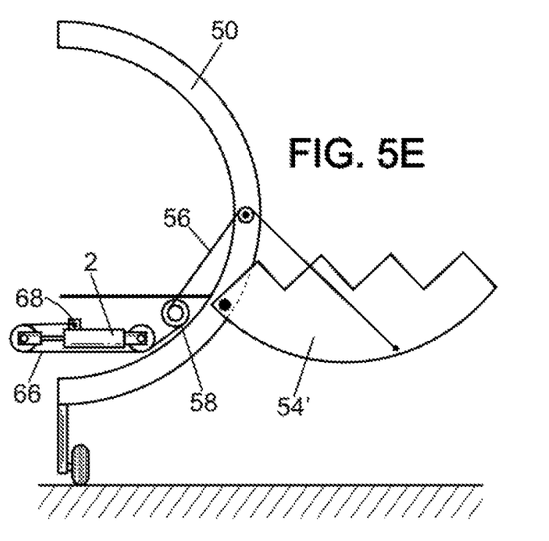

FIGS. 5D and 5E illustrate a device similar to that described with reference to FIGS. 5A to 5C, but here the system providing the damping and spring function is mounted on a fixed part of the aircraft and not on the movable door. Here, the only additional element provided in the embodiment illustrated is a return pulley which may, for example, be mounted on a fixed part of the aircraft, or on a railing or similar element able to move slightly during the opening/closing of the door.

Figure 6:
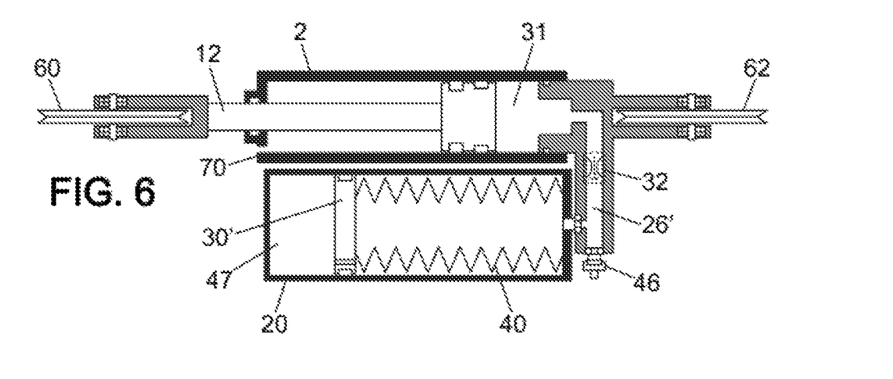

FIG. 6 illustrates an embodiment of a device for assisting the operation of a door in a schematic sectional view similar to the view of FIG. 2.

Figure 7:
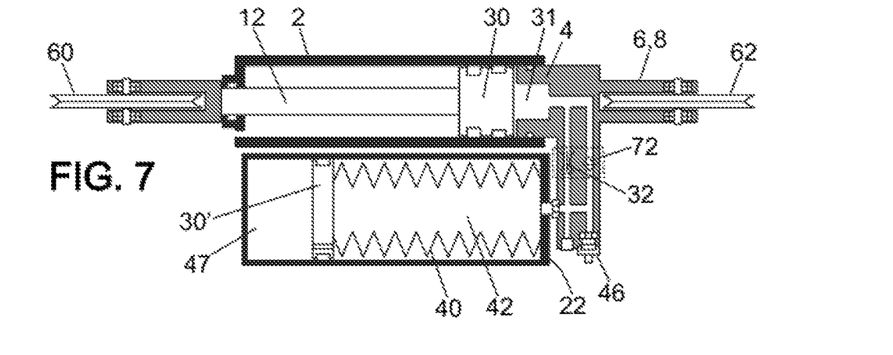
Figure 8:
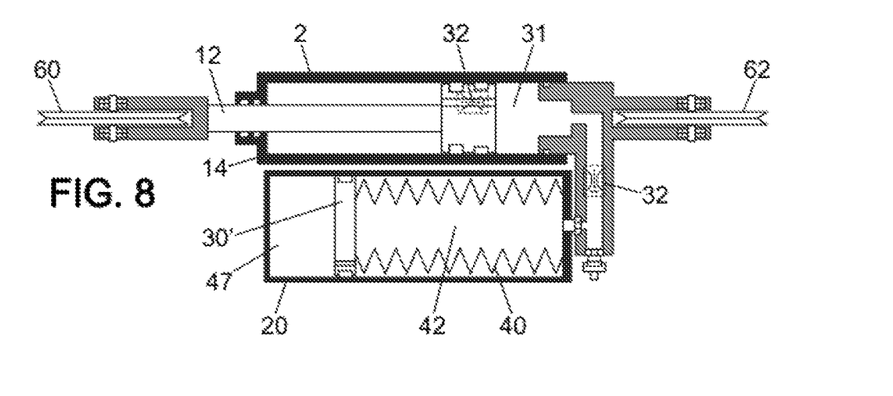

For FIGS. 6 to 8, the references are those from FIGS. 1 to 3 and 5 used to designate similar elements.

One will again recognize the two modules in the figures, which are connected in these embodiments in a manner similar to the embodiment of FIG. 3. In each case there is therefore a tubular body 2 assembled in parallel to a shell 20.

A piston 30 slides within the tubular body 2. A piston rod 12 extends from the piston 30, through a base 14 to outside the tubular body 2. A cover 4 opposite the base 14 closes off the tubular body 2 and together with the piston 30 defines a working chamber 31 within the tubular body 2.

In the shell 20, a metal bellows 40 separates a compensation chamber 42 from a chamber 47 filled with pressurized gas ($N_2$). As already explained above with reference to FIGS. 1 to 3, the shell 20 is a tubular shape closed at one end by a welded construction. A baseplate 22 is welded to form the other end of the shell 20. The baseplate 22 together with the metal bellows 40 and a piston 30' forms a weldment of parts welded together so that the chamber 47 filled with gas is a fully welded enclosure which can vary in volume due to the metal bellows 40.

Compared to the embodiments described above, one will note that the tubular body 2 is not completely filled with hydraulic fluid. Only the working chamber 31 is filled with hydraulic fluid in the tubular body 2. The working chamber 31 communicates via a pipe 26' with the compensation chamber 42 within the shell 20 inside the metal bellows 40. The portion of the tubular body 2 located between the piston 30 and the base 14 has a vent 70 to the open air.

Located on the tubular body 2 is a bracket 6 which here supports the second pulley 62. The piston rod 12 supports the first pulley 60 (in place of the screw eye 10 of FIGS. 1 to 3).

The damping of the device is achieved using fluid damping means, which in the embodiment illustrated are in the form of a choke valve 32 which is placed in the pipe 26'. One end of the pipe 26 is blind, while its other end is closed by a filling valve 46. While in the embodiment of FIG. 2 the damping is performed at the piston 30, here it is performed in the pipe 26'. These two embodiments of the damping function are equivalent. The choke valve 32 is mounted such that the damping only occurs when the piston rod 12 enters the tubular body 2, which corresponds to opening the door. It then regulates the return flow of hydraulic fluid in the compensation chamber 42 of the shell 20 and therefore the retraction speed of the piston rod 12. The choke valve 32 has practically no influence when the flow of fluid reverses. There is therefore very little damping when the rod is moving outward, corresponding to closure of the door (FIG. 5A to FIG. 5C).

To reduce the damping effect when the piston rod 12 is moving outward, it is proposed (FIG. 7) to mount a check valve 72 in parallel to the choke valve 32. This check valve 72 is mounted so that it is closed when the piston rod 12 enters the tubular body 2 and opens when the piston rod 12 exits the tubular body 2. Thus, when the door opens (rod moves inward) the check valve 72 has no influence on damping (all fluid passes through the choke valve 32 or similar arrangement) and when the door closes (rod moves outward), the cross-sectional area of fluid flow is increased between the compensation chamber 42 and the working chamber 31, thus facilitating passage of the fluid.

By way of example, the embodiment of FIG. 8 illustrates a combination of the embodiment of FIG. 2 (and/or 3) and the embodiment of FIG. 6. It is proposed here to provide damping as the rod moves outward and inward. Means for damping the flow of fluid are provided in the piston 30 and in the connection between the working chamber 31 and the compensation chamber 42. It seems unnecessary to describe in detail the embodiment of FIG. 8: those skilled in the art will understand its operation and structure in light of the description of the preceding figures.

The advantages of the device for assisting the opening/closing of an aircraft door having a spring function and an associated damping function have been evaluated.

A first advantage of this system is its cost. This is lower than the cost of a damper and two gas springs. To actuate an aircraft door as illustrated in FIGS. 4A and 4B, a damper and two gas springs (see EP 0876954) are required for the means of the prior art.

Another advantage is that mounting a system of the invention is facilitated. The system described above is mounted as a damper. We therefore save having to mount two gas springs. Because of this, two attachment points are sufficient while six are required to mount a prior art damper with two gas springs.

In the aerospace sector, the weight of a system is important. For an aircraft door, the use of a device according to the invention allows an estimated weight savings of several kilograms (kg) when taking into account the weight of the device of the invention compared to the weight of a damper and two gas springs of the prior art. This weight savings is greater overall, since only two fasteners are needed for a system according to the invention while six fasteners are needed to mount a prior art damper and two gas springs.

These remarks concerning the price and the ease of assembly are also valid for an application of the invention to an aircraft door that tilts open.

Finally, not the least of the advantages is that the reliability of a system according to the invention is far superior to the reliability of an assembly comprising a damper and two gas springs of the prior art. The calculated mean time to failure of a system according to the invention is significantly better than that of an assembly comprising a damper and two gas springs. Using the same determinations of mean time to failure for a prior art system with a damper and two gas springs and for an equivalent system according to the invention, the mean time to failure will be significantly higher, for example 2 to 5 times higher. This gain is considerable and is highly advantageous because it limits maintenance operations.

Having a gas-filled chamber that is fully welded with no gaskets greatly limits the risk of gas leakage. In the field of aeronautics, it is important to be able to guarantee that a device will work properly. In the present case, when the device is intended to be used only occasionally (assisting the operation of an emergency exit), it is even more important to have a reliable device when it is called upon in emergencies.

The present invention is not limited to the embodiment described above by way of non-limiting example nor to the application illustrated in the figures. It concerns all variants mentioned and those within the scope of a person skilled in the art, within the context of the following claims.

For example, it is not departing from the scope of the invention to have a one-piece assembly for creating a system according to the invention instead of two separate modules connected by a flexible or rigid pipe. These two modules could form a single assembly. It could, for example, have a rigid shell incorporating the gas accumulator function, arranged in the extension of the tubular body where the damping function is performed.

In the embodiment corresponding to a door that tilts open, one could have several loops of the support cable around the device for assisting operation according to the invention. The stroke of the piston in its tubular body can then be reduced and the developed force similarly increased, in order to optimize the weight of the assembly.

What is claimed is:

1. An aircraft door, comprising a device for assisting in the operation of the aircraft door, the device comprising:
 a tubular body (2) associated with a first fastener (6),
 a piston (30) provided with a rod (12) connected to a second fastener (10), the piston (30) sliding inside the tubular body (2) and defining inside said body a working chamber filled with hydraulic fluid, an accumulator comprising a rigid shell (20) inside of which is located a separator (40) defining a compensation chamber (42) filled only with hydraulic fluid and in communication with the working chamber, and a chamber (47) filled only with pressurized gas, wherein the rigid shell (20) is a welded metal shell, and the separator in the accumulator comprises a metal bellows (40) welded at a first end to the rigid shell (20) of the accumulator which has a circular cylindrical shape, around an opening of said shell which allows communicating with the working chamber (31), and at a second end to a base (30'), so as to obtain an entirely welded enclosure (47) containing the gas, wherein the tubular body (2) of the device for assisting the operation of the aircraft door is fixed to the door (54'), and wherein the piston rod (12) supports a first pulley (60) at a free end thereof opposite the piston (30), wherein the tubular body (2) of the device for assisting operation supports a second pulley (62), and wherein a cable (66) has a first end attached to the tubular body (2) of the device for assisting the operation of the door, passes over the first pulley (60) then over the second pulley (62), the cable end opposite the first end winding or unwinding on a third pulley (64) pivotally mounted on the door (54').

2. Aircraft door according to claim 1, wherein the tubular body (2) of the device for assisting the operation of an aircraft door is hingedly mounted on the door (54) and wherein the piston rod (12) is hingedly mounted on a fixed frame associated with the door.

3. Aircraft door according to claim 1, wherein the tubular body (2) of the device for assisting the operation of an aircraft door is hingedly mounted on a fixed frame associated with the door (54) and wherein the piston rod (12) is hingedly mounted on the door (54).

4. Aircraft door according to claim 1, wherein the third pulley (64) is mounted coaxially to a fourth pulley (58), the third pulley (64) and the fourth pulley (58) being rotated by a motor, and wherein the fourth pulley (58) receives another cable (56) having a first end fixed to a frame associated with the door (54') and a second end winds or unwinds on the fourth pulley (58) in a manner that controls the opening or closing of the door.

5. The aircraft door according to claim 1, wherein the chamber (47) filled with pressurized gas is filled with an inert gas.

6. The aircraft door according to claim 1, wherein a space containing hydraulic fluid outside of the accumulator comprises a filling valve (46).

7. The aircraft door according to claim 1, further comprising a pipe (26; 26'), which provides communication between the working chamber (31) and the compensation chamber (42) and is equipped with a damping system (32).

8. The aircraft door according to claim 1, wherein the tubular body (2) has a second chamber filled with hydraulic fluid and separated from the working chamber (31) by the piston (30), and wherein a passage in the piston (30) provides communication between the second chamber and the working chamber (31).

9. The aircraft door according to claim 8, wherein the passage in the piston (30) comprises a damping system (32).

10. The aircraft door according to claim 1, wherein the base welded to the metal bellows (40) is a piston (30') having a shape adapted to slide within the rigid shell (20) of the accumulator.

11. An aircraft door comprising a device for assisting the operation of the aircraft door, the device comprising:
a tubular body (2) associated with a first fastener (6),
a piston (30) provided with a rod (12) connected to a second fastener (10), the piston (30) sliding inside the tubular body (2) and defining inside said body a working chamber filled with hydraulic fluid,
an accumulator comprising a rigid shell (20) inside of which is located a separator (40) defining a compensation chamber (42) filled only with hydraulic fluid and in communication with the working chamber, and a chamber (47) filled only with pressurized gas, wherein the rigid shell (20) is a welded metal shell, and the separator in the accumulator comprises a metal bellows (40) welded at a first end to the rigid shell (20) of the accumulator which has a circular cylindrical shape, around an opening of said shell which allows communicating with the working chamber (31), and at a second end to a base (30'), so as to obtain an entirely welded enclosure (47) containing the gas, wherein the tubular body (2) of the device for assisting the operation of the aircraft door is fixed to an aircraft structure, wherein the piston rod (12) supports a first pulley (60) at a free end thereof opposite the piston (30), wherein the tubular body (2) of the device for assisting operation supports a second pulley (62), and wherein a cable (66) has a first end attached to the tubular body (2) of the device for assisting the operation of the aircraft door, passes over the first pulley (60) then over the second pulley (62), the cable end opposite the first end winding or unwinding on a third pulley (64) pivotally mounted on the structure of the aircraft.

12. The aircraft door according to claim 11, wherein the third pulley (64) is mounted coaxially to a fourth pulley (58), the third pulley (64) and the fourth pulley (58) being rotated by a motor, and wherein the fourth pulley (58) receives another cable (56) having a first end fixed to the door (54') and a second end that winds or unwinds on the fourth pulley (58) in a manner that controls the opening or closing of the door.

\* \* \* \* \*